United States Patent [19]

O'Neil et al.

[11] 4,296,282

[45] Oct. 20, 1981

[54] INCOMING CALL IDENTIFICATION ARRANGEMENT

[75] Inventors: Joseph T. O'Neil, Middletown; Thomas M. Quinn, Little Silver; Tse L. Wang, Holmdel, all of N.J.

[73] Assignee: Bell Telephone Laboratories, Incorporated, Murray Hill, N.J.

[21] Appl. No.: 164,358

[22] Filed: Jun. 30, 1980

[51] Int. Cl.³ .............................................. H04Q 5/20
[52] U.S. Cl. .............................. 179/99 LS; 179/84 L; 179/18 BE; 179/18 AD
[58] Field of Search .............. 179/99 LS, 99 A, 99 R, 179/81 C, 84 L, 5.5, 18 B, 18 AD, 18 BE, 18 FH

[56] References Cited

U.S. PATENT DOCUMENTS

| 3,723,654 | 3/1973 | Bunce et al. | 179/18 AD |
| 3,928,732 | 12/1975 | Simon et al. | 179/99 LS |
| 3,931,479 | 1/1976 | Warman et al. | 179/99 A |
| 3,991,282 | 11/1976 | Feil | 179/99 A |
| 4,028,498 | 6/1977 | Mehaffey et al. | 179/18 AD |
| 4,046,972 | 9/1977 | Huizinga et al. | 179/99 LS |
| 4,071,699 | 1/1978 | Sovic et al. | 179/5.5 |
| 4,150,257 | 4/1979 | Fentons et al. | 179/99 LS |

FOREIGN PATENT DOCUMENTS

| 2747718 | 11/1978 | Fed. Rep. of Germany | 179/84 L |
| 2901241 | 7/1979 | Fed. Rep. of Germany | 179/5.5 |

Primary Examiner—Gerald L. Brigance
Attorney, Agent, or Firm—David H. Tannenbaum

[57] ABSTRACT

One example of problems encountered in electronic telephone systems occurs when calling party identification (CPI) is used with call coverage. With CPI a lamp field is used to provide a called station (S2) with the identity of the calling station (S1). With call coverage an incoming call of a called station is rerouted to a coverage button (210B) of some other station (S3). The coverage station is informed as to the identity of the original called station, as opposed to the identity of the calling party, by an arrangement which modifies the lamp field (214) indication on calls directed to the call coverage button (210B). Thus, when the call coverage button (210B) is in the active ringing state the lamp (215) on the display field associated with the original called station (S2) flashes. However, when calls are incoming directly to the station (S13) of the lamp field (214) is used to provide a visual indication of the calling station (S1). The system is arranged to display ICI information automatically before the call is answered, and upon demand after the call is answered.

3 Claims, 14 Drawing Figures

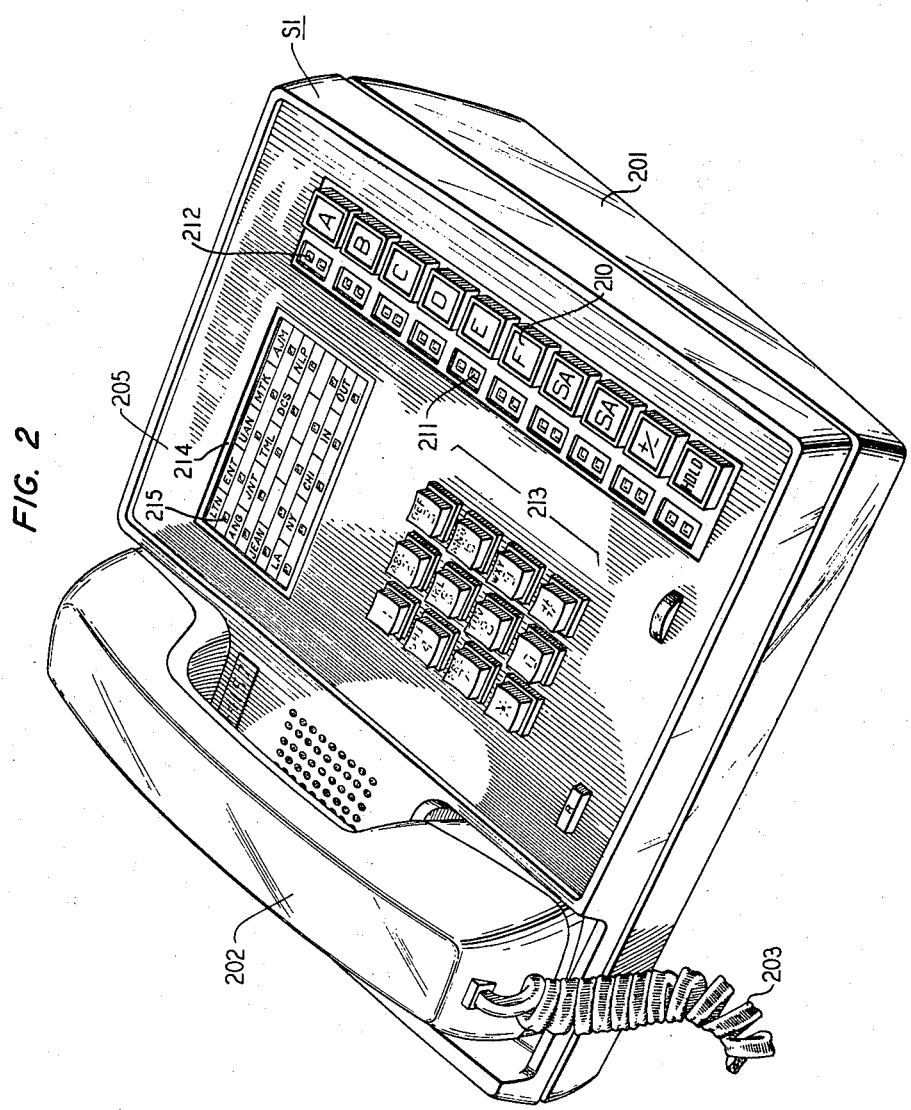

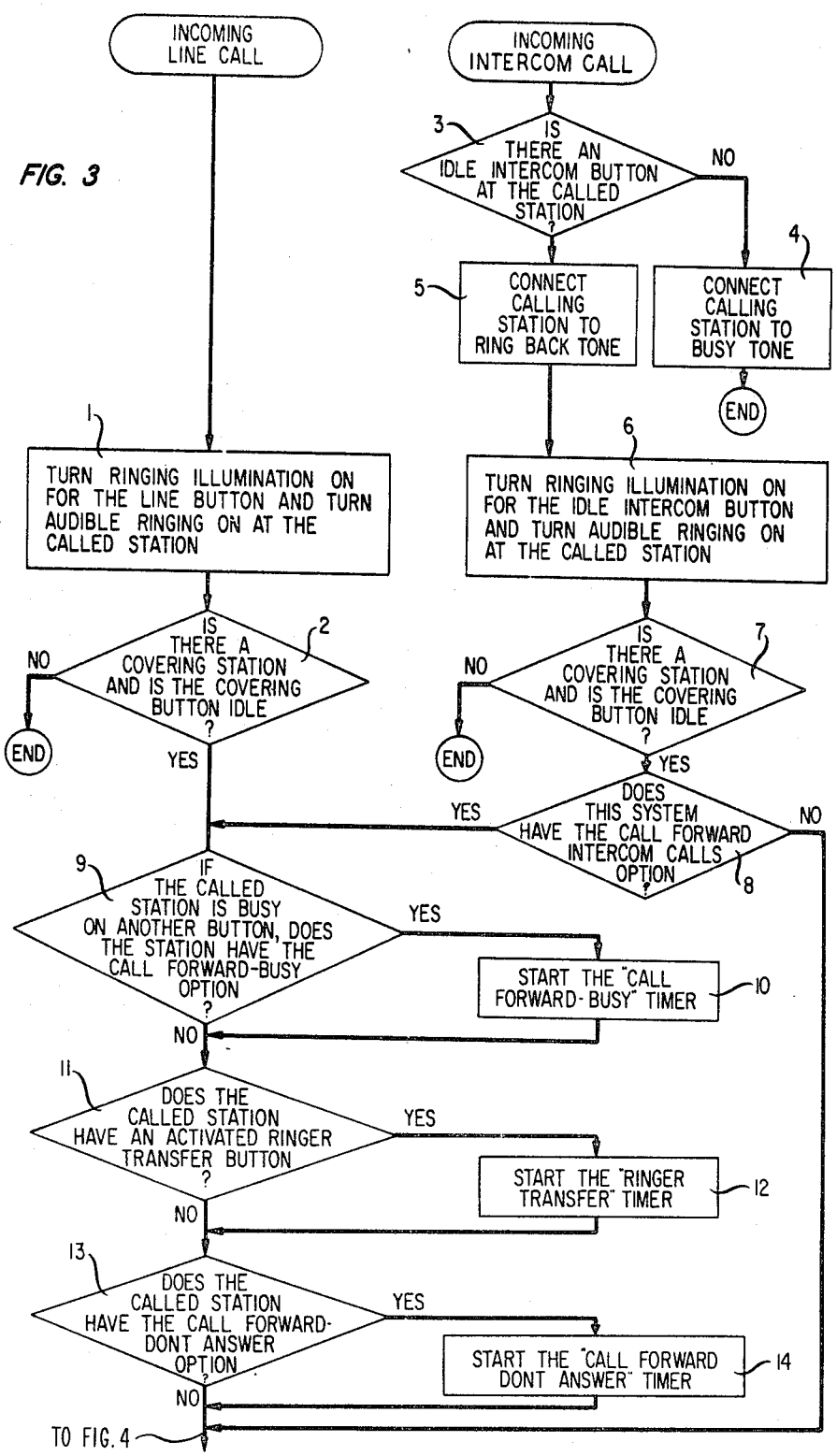

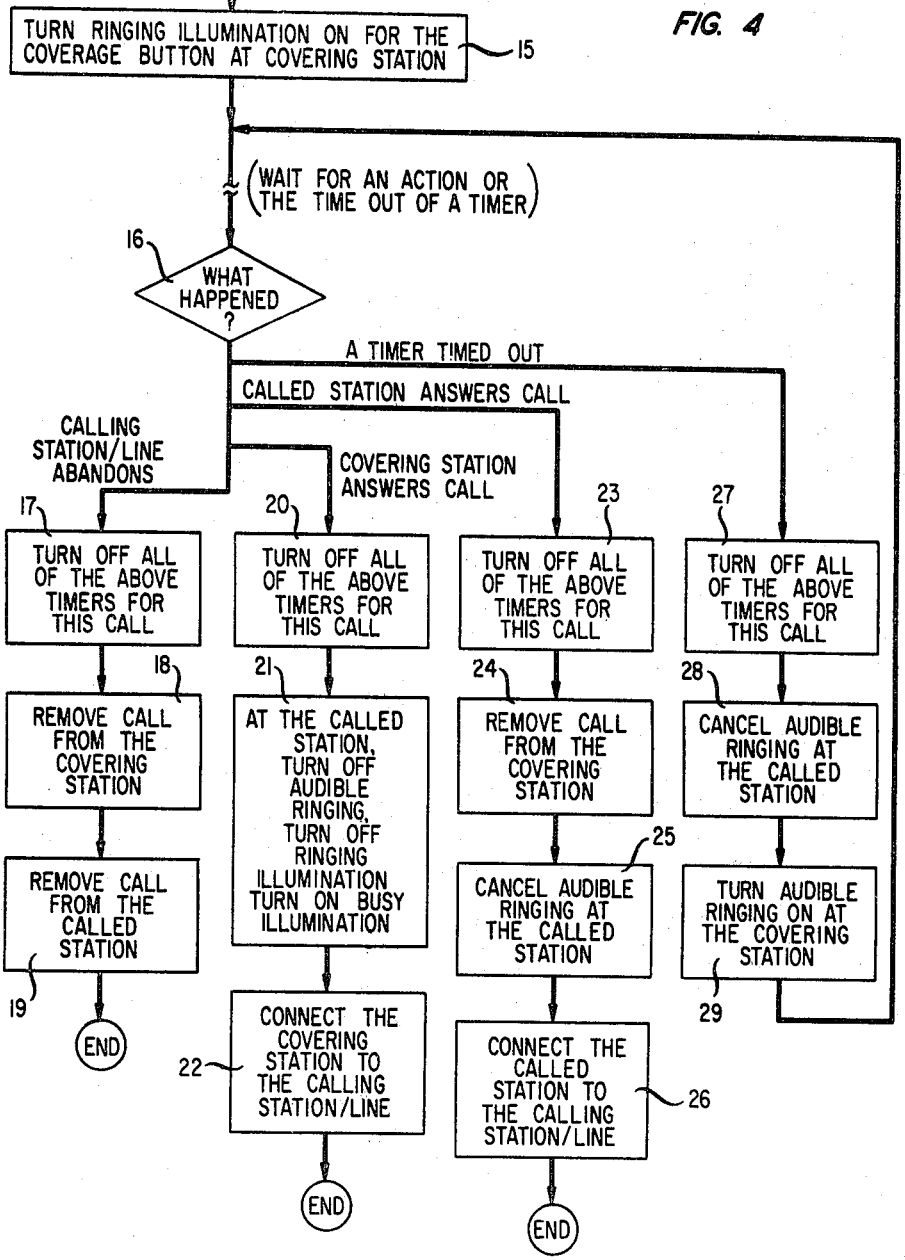

FIG. 5

| DATA ITEMS | |
|---|---|
| OUTSIDE LINE TO STATION AND BUTTON TRANSLATION | STATION / BUTTON |
| STATION BUTTON STATUS | STATUS LED ON/OFF/WINK/FLASH |
| STATION RINGER CONTROL | RINGER ON/OFF |
| COVERED STATION TO COVERING STATION AND BUTTON TRANSLATION | STATION / BUTTON |
| INTERCOM NUMBER TO STATION TRANSLATION | STATION |
| SYSTEM ENABLES FORWARDING OF INTERCOM CALLS TRANSLATION | FORWARD ENABLE FOR ICM CALLS |
| STATION CALL, FORWARD-BUSY ENABLE TRANSLATION | CALL FORWARD-BUSY ENABLE |
| CALL FORWARD-BUSY TIMER STATUS | TIMER RUNNING VALUE |
| CALL FORWARD-DON'T ANSWER TIMER STATUS | TIMER RUNNING VALUE |
| RINGER TRANSFER TIMER STATUS | TIMER RUNNING VALUE |
| STATION CALL FORWARD-DON'T ANSWER ENABLE TRANSLATION | CALL FORWARD-DON'T ANSWER ENABLE |

*FIG. 6*

DATA ITEMS

STATION BUTTON IDENTIFICATION
FOR OUTSIDE LINE BUTTON

| FUNCTION (OUTSIDE LINE) |
| --- |
| RINGER ENABLE |
| PRINCIPLE STATION FLAG |
| NEXT STATION |
| NEXT BUTTON |

STATION BUTTON IDENTIFICATION
FOR CALL COVERAGE BUTTON

| FUNCTION (CALL COVERAGE) |
| --- |
| CALL FORWARD RINGER ENABLE |
| NEXT STATION |
| NEXT BUTTON |

STATION BUTTON LINK POINTER

| LINK NUMBER |
| --- |

FIG. 11

PREVIOUS STATION ADDRESS
TABLE SADT

```
    SADT
0 | X X X X X X X X |
1 |    STATION 1    |
  |       ...       |
86|    STATION 86   |
```

PER BYTE ENTRY:

| CARR ID | PORT | BOARD CODE |
|---------|------|------------|

HARDWARE ADDRESS

CARRIER ID: 0 = TOP CARRIER; 1 = BOTTOM CARRIER
PORT ID: 0 = 3
BOARD CODE: = CARRIER SLOT NUMBER + 2

AUTO ICI FOR COVERAGE BUTTONS

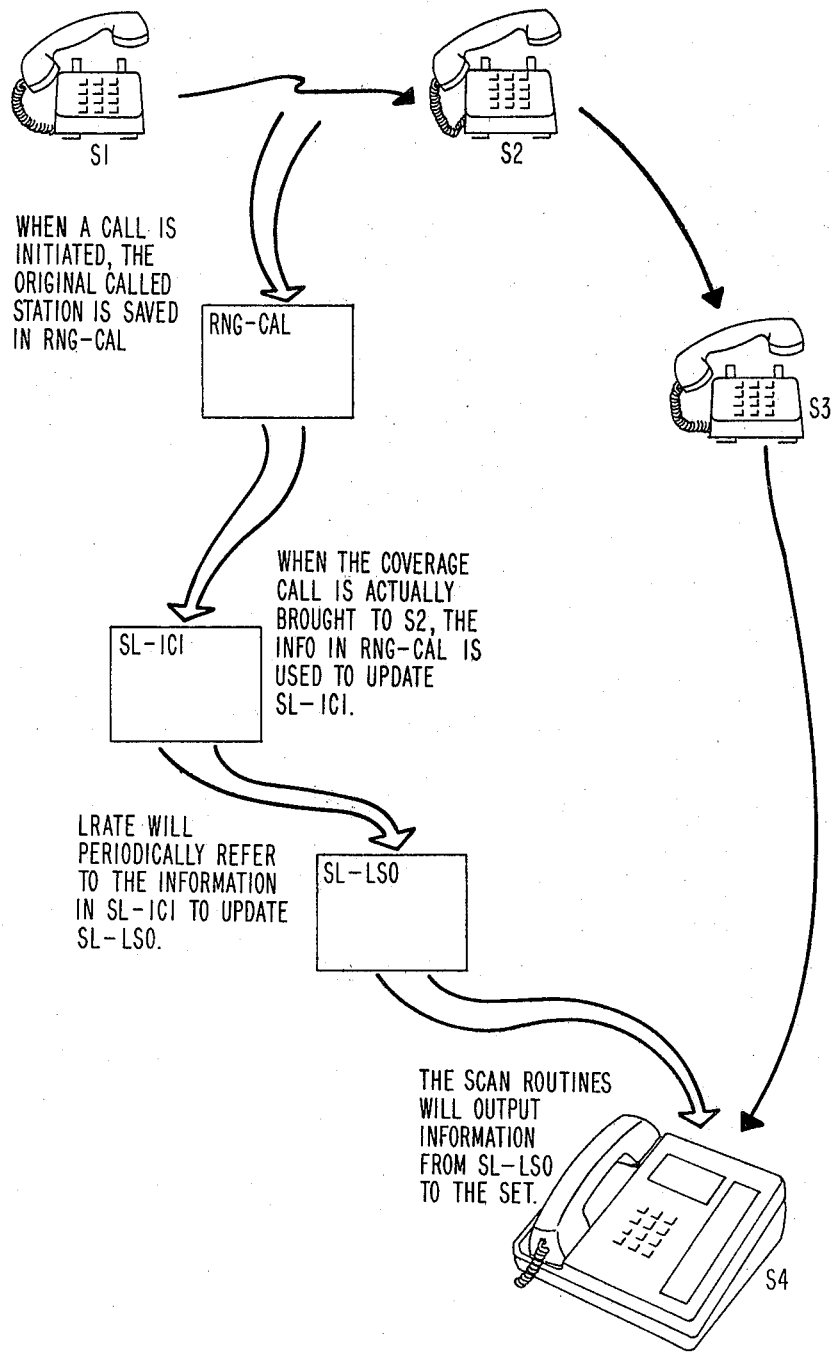

INCOMING CALL IDENTIFICATION ARRANGEMENT

BACKGROUND OF THE INVENTION

This invention is directed to an improved call identification system for use in an electronic communication system and more particularly to an arrangement for either displaying the calling station or the called station depending upon the original destination of the call.

One problem inherent in designing communication systems is that incoming calls to one station frequently must be rerouted to other stations under a variety of circumstances which include the original called station being unavailable because the called subscriber is otherwise busy or because the called subscriber is absent from the station set. In this situation it is desirable to have the incoming calls of one station answered or covered by another station. This feature is called call coverage. Such a feature is disclosed in U.S. Pat. No. 4,150,257 dated Apr. 17, 1979 where a single button is used at the coverage station to indicate to the covering party that a coverage call is incoming to that station on a coverage button common to many stations. Thus, the answering party is informed that a call, originally directed to some other station, requires answering. In the described call coverage arrangement the answering (call coverage) party is not informed of the identity of the originally called station. This presents a problem in that there can be confusion on the part of the caller, since the call is being answered by someone other than to whom it is directed. The answering party may also become confused since there is no convenient method of knowing to which station the call was originally directed.

SUMMARY OF THE INVENTION

In an attempt to solve the above problems without the additional use of lamps we have arranged an electronic communication system to take advantage of the existing calling party identification lamps (CPI), which lamps are used to indicate to a called station the identity of the calling station. With call coverage, as above discussed, an incoming call of a called station is rerouted to the coverage button of a covering station. When this occurs, we have arranged the system to modify the lamp field indication such that there is displayed at the coverage station the identity of the originally called station as opposed to the display of the calling station identity. The combined display will be called incoming call identification (ICI).

Furthermore, two modes of display are arranged. First, the automatic ICI will display the ICI information automatically whenever there is an incoming call to the station. This allows the station to get the information without having to interfere with what the user is doing (e.g., talking on another line). Second, the demand ICI will display the ICI information associated with a particular button only when that button is depressed. This allows the user to (1) identify the call when there are multiple incoming calls; (2) retrieve the ICI information after the call is answered and placed on hold immediately because the user is busy. In both modes, the same display device is used to display different (calling or called station) information depending on the nature of the call.

Since the coverage station may have calls directed thereto both directly (being the original called station) and indirectly (being a coverage station) modification of the lamp indication field must be made dependent upon the actual call termination point, which is unknown at the time the call is originally placed.

BRIEF DESCRIPTION OF THE DRAWING

The foregoing features and objectives together with the operation and utilization of the present invention will be more apparent from the following description, taken in conjunction with the drawing, in which:

FIG. 2 shows a pictorial representation of a MET station set;

FIGS. 3 and 4 show a flow chart of the steps used to derive the claimed invention in one system;

FIGS. 5 and 6 show some of the data items used in this processing;

FIG. 11 shows hardware locations of stations;

FIG. 14 shows how the output data stream for the station is formed.

GENERAL DESCRIPTION—BACKGROUND

Before beginning a general discussion of the specific features claimed it may be helpful to review in general terms the operation of an overall system in which the claimed feature can be utilized. It should be borne in mind that such a feature can be used in any number of similar type systems and thus only background information on one type of system will be presented. In addition, since communication system features may be used with different types of systems each dependent on different hardware constraints and upon different programming techniques, no attempt will be made to detail the entire program used to control the overall system, as such would cloud the issue and unnecessarily lengthen this specification. Quantities mentioned were engineered for particular time and memory requirements and will not be the optimum for all such systems.

It will, of course, be obvious to one skilled in the art that in order for the feature described and claimed herein to be used with any communication system, the feature must be blended into the overall structure of the system in which it is used and must be tailored to mesh will all of the other features and operations of such a system. Thus, in order to avoid confusion and in order to allow those skilled in the art to utilize the invention claimed herein this patent specification will concentrate on providing an understanding of the problems and constraints typically found in a communication system where the feature may be used. The patent specification will provide the logical steps necessary for the implementation and blending of the described feature into such a larger system, having many such features.

TYPICAL OVERALL SYSTEM OPERATION

Figure 1:
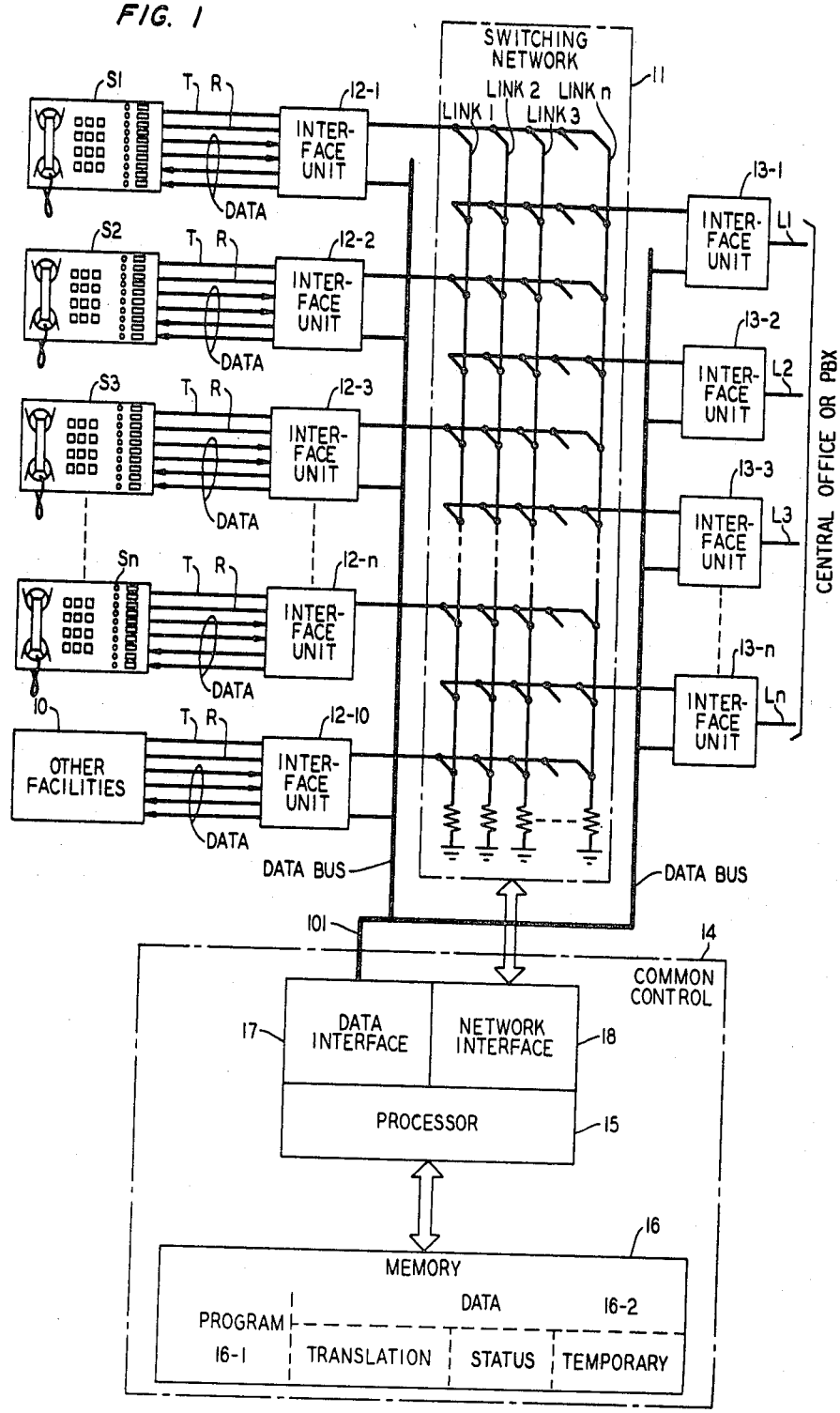
FIG. 1 shows an overall system configuration having several multibutton electronic telephone (MET) stations (and one single-line station)

One such communication system where the structure claimed herein can be used is a station oriented, solidstate, stored program control, business communication system. FIG. 1 shows a block diagram of such a system which combines the usual key system features (hold, visual indication, etc.) with many new features not previously available.

Call processing in the system is under the control of a microprocessor 15 in common control 14. Each station such as station S1, and line port, such as 13-1, is scanned to detect any changes in status. In response to any change (e.g., on-hook, button depression, etc.), the processor, per instructions in the stored program in memory 16 translates these changes into system commands. The system also generates commands via a bidirectional data bus to the multibutton electronic telephone (MET) set, which is shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls. The system also controls non-key sets which offer less expensive (and less powerful) station position alternatives.

In the MET set implementation the first (lower) four buttons on each MET station set are always the same. They are: Hold, +/−, and two System Access buttons, each associated with the intercom number of the particular station. The +/− feature is described in U.S. Pat. No. 4,150,259 dated Apr. 17, 1979. The System Access buttons are used to receive calls from other stations within the communication system (intercom) and to originate such calls or to access system facilities such as lines, paging ports, etc. Incoming calls may terminate on either System Access button depending on their busy-idle status. If the lower one is busy, a second incoming call comes to the second (upper) one, giving a visual call waiting indication, accompanied by a single audible ring if the station is off-hook. The System Access buttons are also used in conferencing and call transfer features, as described in U.S. Pat. No. 4,125,748 dated Nov. 14, 1978. The remainder of the buttons on the MET station sets are flexible buttons and can be assigned to any of the button-activated station features such as call coverage. Call identification field 214 is shown having a matrix of LED lamps 215, each one associated with a particular system facility such as station, paging port, line pool, or a direct group calling (DGC) group which is composed of stations in a call distribution group.

Figure 8:
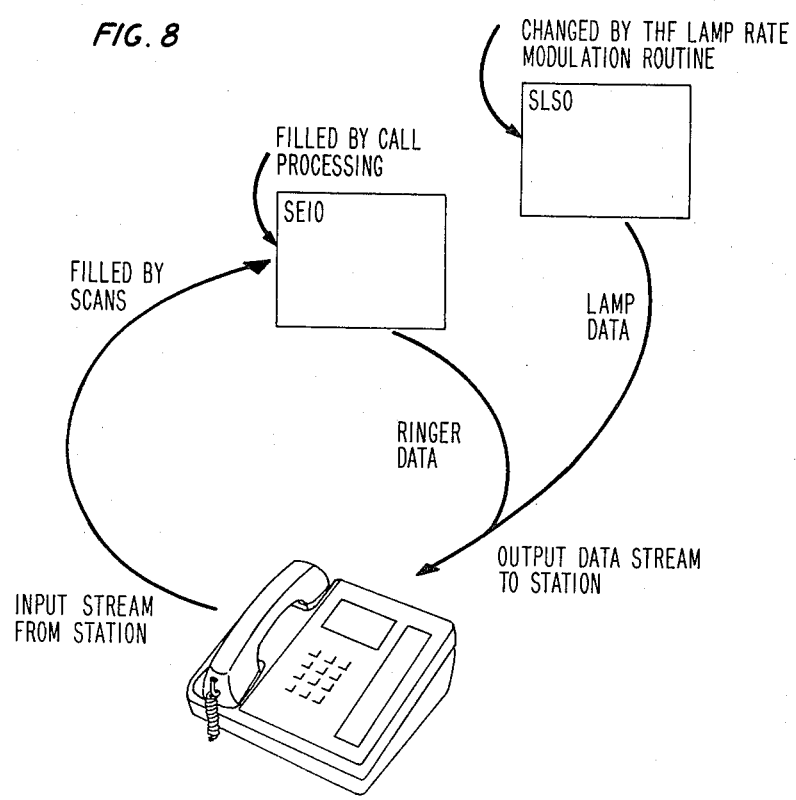
FIG. 8 shows the data stream to the station.

The default mode of each display indicates the busy/idle status of that facility. When the station associated with a particular LED in the matrix goes off hook, this will be indicated by the lamp going active. Conversely, when that station goes on hook, this will cause its associated appearances in any special lamp field to become inactive. This action is shown in FIG. 8. The use of this field 214 for incoming call identification shall be discussed later.

As shown in FIG. 1 there are three pairs of wires coming out of the MET set to the interface unit: T and R, data in, data out. The T and R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly.

Common control 14 consists of processor 15, interface units 17 and 18 and memory 16. The memory unit consists of a program store 16-1, and a data store 16-2. The data store is subdivided into the following:
 A. Translation which contains the hardware configuration data. For example, the button assignments and station class of service.
 B. Status which stores the state of the system at a given moment. For the station, it contains
  (a) station state: switchhook; +/− operation; whether actively connected to the network or not,
  (b) button state: for each button
   (i) if the red I-Use LED is on
   (ii) what is the green status LED state
   (iii) which link is associated with the call on this button.
 C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets a flag and returns to the interrupted task which, in turn, will relinquish control to TSK-DSP control, as soon as it reaches a convenient break point. The task dispenser decides which task is to be executed next according to a schedule. Basically, these tasks fall into three categories:
 (1) Scan: Scan for physical changes (e.g., a new button depression by a station). If a change is detected and confirmed, it will be stored in a temporary buffer to be processed later.
 (2) Process: After all scans are completed, changes will be processed.
 (3) Maintenance: If there is time left in the 25 MS cycle, the system will perform routine maintenance functions until the next work cycle begins.

The following features can be implemented by the system discussed herein.

I-Use Indication

This feature provides a red I-Use LED, such as LED 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

Line Status Indication

Call status indications are given by means of a green status LED, such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

Call Coverage

Call coverage is associated with a group. Each station has the option of being a sender into a given group. As a sender, that station's calls may be answered by coverage buttons associated with that group. In addition, each station has the option of being a coverage position for one or more groups—one equipped with a COVR button (or buttons) to answer calls directed from senders into the group (or groups). The status LED associated with a COVR button at each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, et cetera. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to eight coverage positions (i.e., eight coverage buttons may be defined for any given group).

Ring Transfer

Ring transfer is accomplished by equipping any sender station into a Call Coverage group with a RING TRFR button to transfer audible ring to predetermined Forwarding Destination stations having coverage buttons for the associated group after a single burst of ringing. Depressing the RING TRFR button will activate this feature and light the button's status LED. Once activated, the feature will transfer ringing on any future call directed to the station. The feature is deactivated by a second push of the RING TRFR button. Except for the audible ring at the Forwarding Destinations, such calls are treated exactly as with basic Call Coverage. Any or all stations having coverage buttons for the group may be designated as Forwarding Destinations for this feature as well as Call Coverage on Busy and Call Coverage on Don't Answer.

Any sender station into a Call Coverage group may elect to have this feature. Calls directed to an idle button appearance on the sender station, while that station is busy on another line, will start ringing at predetermined Forwarding Destination stations for the associated group after a single burst of ringing at the sender station. Calls directed to the sender station and left unanswered for 1 to 15 rings (option) will transfer ringing to predetermined Forwarding Destination stations for the associated group. Except for the audible ring at the Forwarding Destinations, such calls are treated exactly as with basic Call Coverage. Any or all stations having coverage buttons for the group may be designated as Forwarding Destinations for this feature as well as Call Coverage on Don't Answer and Ring Transfer.

Station-to-Station Calling

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set. The switching network and line circuits shown in FIG. 1 can be of the type shown in U.S. Pat. Nos. 3,991,279 and 3,991,280, both issued Nov. 9, 1976, and in U.S. Pat. No. 4,110,566 of J. J. Shanley, dated Aug. 29, 1978.

General Description—Operation Example of Call Coverage

With reference to FIG. 2, assume that a call is incoming to station S1 on button A. This call would cause the line status lamp (the lower of the two LEDs) associated with button A to flash. In the situation where immediate call coverage is available and where station S2 has coverage capability on a button, such as, for example, button C, then the lamp associated with button C at station S2 would flash.

As discussed above, if station S2 were in the same office as station S1 it might be determined by the user that it is not necessary to have the ringer at station S2 also operate, thereby reducing confusion and distraction. In such a situation the system can be arranged such that only the lamp associated with button C at station S2 would operate. Where station S2 was located at some other physical location, then the system could be arranged, as will be discussed, such that both the lamp and the ringer will operate at station S2. Also, it should be noted that a third station could also be a coverage station for station S1 and the third station could or could not have its ringer activated on a coverage call to station S1 independent of the action taken at station S2 for station S1 coverage calls.

Also, as will be detailed, button C at station S2 which is used to handle coverage calls for station S1 can also be used to cover calls for any other station in the system.

As will be detailed, call forwarding occurs when a call incoming to one station is transferred to other stations with abbreviated ringing at the called station. Such an arrangement is a subset of call coverage and is implementable, also on a per station basis, such that all calls to a station will go to other designated stations.

During the call coverage period when station S2 has answered a call directed to station S1 it may happen that the station S1 user returns to the office or otherwise becomes available to answer the call. In such a situation, the user at station S1 merely lifts the handset and operates the button associated with the incoming call and a communication connection is established to the calling party, even though station S2 is also on the connection.

Detailed Description

In the status memory (FIG. 1, item 1b) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button I-Use (SBI) for the I-Use LED.

Also, for each station set, there is a status memory location for recording:

(c) the last detected instantaneous state of the station's switchhook and buttons (d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switchhook and buttons.

The returned data is compared with that in (c) above and if there are any changes, records these in a temporary buffer for that station. At a different time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical form, e.g., a value of 1 identifies a personal line button, a value of 2 identifies a pooled line button, et cetera.

For a speech-type button (e.g., system access, autointercom, personal line, pooled line, call coverage, et cetera), there are four possible states which will be shown to the user on the status LEDs: namely, busy—(LED steady on), idle—(LED dark), ring—(LED flash), hold—(LED wink).

This information is stored in the status data memory (16-2 in FIG. 1) coded in numerical forms. For a non-speech-type button like message-waiting, the same data format is used although the valid states may reduce to two (busy and idle).

As described early, the scan routines in the system detect and report a button push by the MET user to a buffered area to wait for the process routines to process. When such a change is processed by the process routines the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) speech-type (from SBID) button implies call origination requiring the associated facilities, (2) a ringing (from SBS) speech-type (from SBID) button implies answer a ringing call.

The following discussion is made with reference to FIGS. 3 and 4 and shows the steps necessary to accomplish the claimed call coverage feature.

When an outside line is detected to be ringing, it is assigned an idle link and a record for that line (Outside Line to Station and Button Translation) is consulted to determine which station and which button on that station is to be connected to that line. All that is required to "rewire" that line to another station and button is to change this Outside Line to Station and Button Translation Record. Then in Step 1, ringing illumination is applied to the line button by changing the Status LED record to indicate "flash".

Detailed Description 1

The link to which the outside line was assigned is recorded in the station button link pointer record. The Station Button Identification record is consulted for this station and button. This record has an entry which indicates whether this station should receive audible ringing for incoming calls to this button. It has another entry which indicates whether this station is the principle appearance for incoming calls on this outside line. If the station is the principle appearance, this fact is saved for use in step 2. The last two entries in the Station Button Identification Record shows the station and button of a second station which has an appearance of this outside line, if there is any other station with a bridged appearance of this line. As long as there are additional station appearances of this line (as indicated by the Station Button Identification Record for the station currently being placed into the ringing state) these stations will have the corresponding button illumination changed to ringing, button link pointer updated, and the audible ringer turned on as outlined above for the first appearance of this outside line.

In step 2, the Covered Station to Covering Station and Button translation record for the station with the principle appearance for this line (discovered in step 1) is consulted to determine if the called station is covered by a covering station. If not, the incoming call handling is complete—normal handling continues at this point (monitoring for answer from called station or abandon from calling line). If the principle called station is covered, control continues at step 9. Since the Covered Station to Covering Station and Button Translation Record has an entry for each covered station, it is possible to have two different stations covered by the same single button on one covering station.

In step 3, an internal call (intercom call) has been detected, assigned to a link and the Station Translation Record is consulted to determine which station is to respond to that intercom number. The called station is checked for an idle system access button. If none exist, control continues at step 4 with busy tone returned to the calling station. If an idle system access button does exist, control continues at step 5.

At step 4, a busy tone is connected to the calling station, indicating that there are no idle system access buttons at the moment on the called station. Incoming call handling is terminated at this point.

At step 5, an idle system access button has been found at the called station. Ringback tone is connected to the calling station indicating that the called station is ringing. Control continues to step 6.

At step 6, ringing illumination is applied to the idle system access button by changing the Status LED record to indicate "flash". The button link pointer record for this button on this station is changed to record the link number assigned to this call. Also, the audible ringer is turned on by changing the station ringer control record to indicate ringer on. Control continues to step 7.

In step 7 (similar to step 2), the Covered Station to Covering Station and Button Translation Record is consulted to determine if the called station is covered by a covering station. If not, the incoming call handling is complete. If the called station is covered, control continues at step 8.

At step 8, the system translation record Enable Forwarding of Intercom Calls is consulted. If forwarding of intercom calls is enabled, control continues at step 9. If forwarding of intercom calls is disabled, control continues at step 15.

At step 9, the Call Forward-Busy Translation record for the called station (principle station for outside lines) is consulted. If Call Forward-Busy is enabled and the called station is busy (talking on another button) control continues at step 10. Otherwise control continues at step 11.

At step 10, the call forward-busy timer is turned on to give a timer timed-out action after the call forward-busy delay time has elapsed. Control continues at step 11.

At step 11, the station button identification record for the called station is searched looking for a ringer transfer button as indicated by the function subrecord. If that button exists and the status is on, control continues at step 12. Otherwise control continues at step 13.

At step 12, the ringer transfer timer is turned on to give a timer timed-out action after the ringer transfer delay time has elapsed. Control continues at step 13.

At step 13, the Call Forward-Don't Answer Translation Record for the called station is consulted. If call forward-don't answer is enabled, control continues at step 14. Otherwise control continues at step 15.

At step 14, the call forward-don't answer timer is turned on to give a timer timed-out action after the call forward-don't answer delay time has elapsed. Control continues at step 15.

At step 15, ringing illumination is applied to the covering button at the covering station by changing the station button status LED record to indicate "flash". The link assigned to this call is recorded in the station button link pointer for the covering button at the covering station. The last two entries in the Station Button Identification Record for the covering button at the covering station shows the station and button of a second covering station if there is more than one covering station. As long as there are additional covering stations (as indicated by the Station Button Identification Record for the station currently being given ringing illumination) these stations will have the corresponding button illumination changed to ringing and the button link pointers updated. The incoming call handler then waits for an action associated with this call to occur. After the action does occur, control continues at step 16.

At step 16, the type of call handling action is determined. If the calling station or line abandons the call, control continues at step 17. If a covering station answers the call, control continues at step 20. If the called station answers the call, control continues at step 23. Finally, if one of the timers turned on in step 10, 12 or 14 times out, control continues at step 27.

At steps 17 through 19, the call is abandoned. Therefore, the timers turned on in steps 10, 12 or 14 are turned off. The call appearance at the covering station (ringing illumination on the covering button, button link pointer for the covering button and audible ringing if on for this call) is removed. Finally, the call appearance at the called station is removed. Incoming call handling then terminates for this call.

At steps 20 through 22, the call is answered by the covering station. Any timer turned on in steps 10, 12 or 14 is turned off. The call appearance at the called station is changed from ringing to busy by changing the called station button status to "on" and by turning the audible ringer control from on to off. Finally, the covering station has the call appearance on the covering button changed from ringing to busy, the corresponding I-Use illumination changed to ON, the audible ringer turned off and the covering station connected to the calling station/line. The call appearance is removed from any other covering stations. This terminates incoming call handling for this call.

Steps 23 through 26, the call is answered by the called station. Any timer turned on in steps 10, 12 or 14 is turned off. The call appearance is removed from the covering button at the covering station. The call appearance is changed to busy, and the corresponding I-Use illumination changed to ON at the called station. The called station is connected to the calling station/line. This terminates incoming call handling for this call.

In steps 27 through 29, the call is forwarded to the covering button at the covering station because a timer turned on in steps 10, 12 or 14 timed out. First, the timers turned on in steps 10, 12 or 14 are turned off. Then audible ringing is turned off at the called station. Then audible ringing is turned on at those covering stations which have an entry in their Station Button Identification Record for the covering button which enables audible ring in for call forwarding. Finally, incoming call handling continues at step 16, waiting for an action to occur (in this case, waiting for the calling station/line to abandon the call, or for the covering station to answer, or for the called station to answer).

Internal Software Operations

Figure 7:
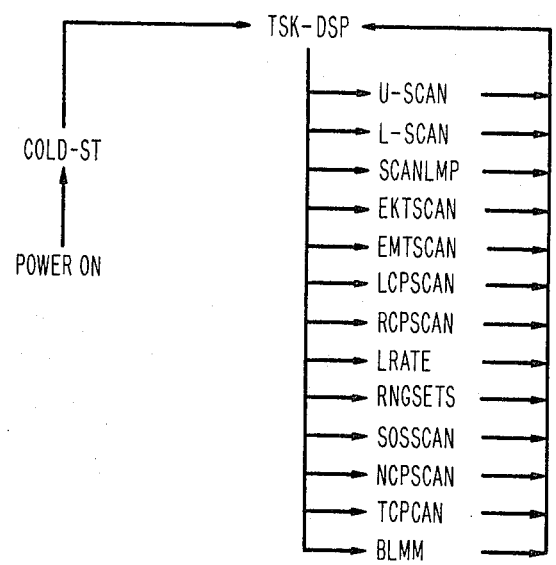
FIG. 7 shows an overview of the system software structure.

As indicated in FIG. 7, the overall software structure of the disclosed Communications System is a hierarchical one. Upon power-up, system memory and equipment is initialized via the routine COLD-ST. Control then passes to the TSK-DSP (task dispenser) which can be viewed as the master control program for the system. This routine is responsible for scheduling the work and scanning which must be done by the system. Note that certain kinds of equipment must periodically be scanned so that input stimuli are not lost (e.g., button depressions, switchhook changes, changes on CO lines, etc.) and output stimuli are sent at the proper rate (e.g., outpulsing on CO lines, ringer modulation on stations, etc.). The translation for FIG. 7 is as follows:

TSK-DSP: Task Dispenser
    U-SCAN: Administration
    L-SCAN: Line Scan
    EMTSCAN and SCANLMP: MET Station Scans
    EMTSCAN: EMT Station Scans
    LCPSCAN: Line Call processing
    RCPSCAN: Origination Register (OR) call processing
    LRATE: Lamp Rate Modulation
    RNGSETS: EMT Ringer Modulation
    SOSSCAN: Call Processing for Stations
    NCPSCAN: Link call processing
    TCPSCAN: Tone Call Processing
    BLMM: Base Level Maintenance The following discussion will describe how the MET stations and the coverage feature are managed in the system.

A single MET station control board can control up to four different MET stations. The actual hardware address corresponding to a particular station is stored in the SCKT table. Also provided is the slot in which that board is located. This table is referred to by the scan routines (viz. EKTSCAN and SCANLMP) in the process of actually sending and receiving MET station data. The procedures involved in interfacing to the MET will now be described.

Two kinds of information must be sent to the MET station: the state of the audible station ringer and the states of the IUSE and STATUS lamps associated with the buttons. Ringer information is maintained in the SEIO table. The volume and frequency of the ringer are controlled by sending data from the appropriate location in this table to the station set. In addition to the ringer, the states of the IUSE and STATUS lamps must be sent to the station. The SLSO table holds this information. The use of these two tables by the scan routines is illustrated diagramatically in FIG. 8.

Data received from a MET station indicates: (1) which of any button may currently be depressed and (2) the current state of the switchhook. As discussed, this received data is stored in the SEIO table and is consulted later by the call processing routines.

When a button depression is detected by the scan routines, call processing must interpret this stimulus from the user to activate a feature: answer a call, initiate a call, etc. Each button is assigned a specific meaning through the SBID table illustrated in FIG. 9. Note that on a regular ten button MET, only the top six buttons are programmable by the end user. Each of these buttons is described by two bytes in the SBID table which contain the definition of that button and any associated parameters needed to describe it. Thus, when a button is depressed, this table is used to interpret what action the end user is requesting.

Figure 10:
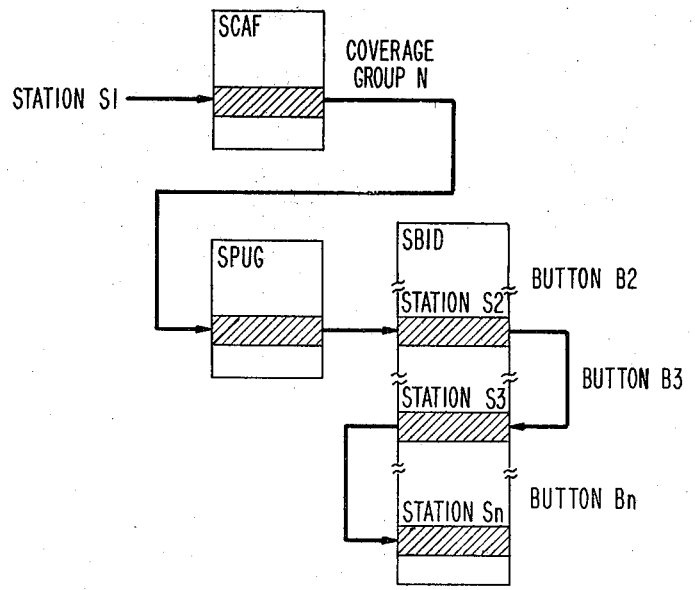
FIG. 10 shows how coverage groups are organized.

When a call arrives at a station, such as station S1, it might also appear at coverage stations S2 and S3. The following will describe how these coverage receivers are located. Station S1 can elect to have its calls covered by coverage group N. This fact is recorded in translation memory via the SCAF table. Once the index of the appropriate coverage group has been determined, the software must find which buttons on which stations should be activated for this call. FIG. 10 shows the internal data structures used to accomplish this. As shown, there are two steps involved in this process. First, the first station button pair in the coverage group must be determined (viz. station S2, button B). This is done with the SPUG table. Second, it will be noted from FIG. 10 that each entry in SBID for a coverage button points to another station, button pair which is to be used as a coverage receiver. That is station S2, button B2, points to station S3, button B3 and station S3, button B3, points to station Sn, button Bn.

When a coverage receiver answers a call, the appearance of that ringing call at the other coverage buttons must be extinguished. This is done by again following the chain of coverage buttons depicted in FIG. 10.

When a call is brought to any button, the software establishes an association between that button and the link on which that call is present. This association is maintained in the SBLP table. When any button is depressed the software checks not only the SBID table to determine the function of that button, but also the SBLP table to determine what call that button is associated with. Thus, it is known what link this station's voice path should be physically connected to.

The last operation of the coverage feature which will be examined is the forwarding of ringing to a coverage receiver. When a call is first brought to a station and its coverage receivers, the software establishes a "timer" for that call. When this "timer" goes to zero, the coverage receivers will start ringing for the call. To time for N seconds, for example, the NTVB entry for that link is set for 5 seconds. The software will periodically test this value and when the 5 second period has elapsed, it will execute whatever action is required for that call. The NSIB table is checked to determine what action should be taken. If the call fowarding flag for that link is set, then ringing will be transferred to the receivers in the coverage group.

Incoming Call Identification

As discussed, the station address table (SADT) translates between internal station indices and hardware locations (i.e., port number and board code). This is shown in FIG. 11. The modules which do the input (scanning for switching changes, button depressions, et cetera) and output (updating the IUSE and STATUS lamps associated with the buttons and modulating the ringers) execute the following algorithm:

for each internal station index (i.e., between 1 and 86)
Translate from internal station index to hardware address with SADT.
Send ringer and lamp data to set.
Receive button depression and switchhook status information.

This algorithm had to be modified slightly to properly control the call identification feature. The difference is that an extra 20 bits of information must be transmitted to the station (one bit for each lamp) if it contains the lamp field option. The following issues arise: (1) identification of stations with the special lamp field; and (2) storing and managing data for the twenty individual lamps.

The scan modules EKTSCAN and SCANLMP are very real-time intensive. That is, because they execute so often in the system (every 25 ms) it is important that they be coded efficiently and not consume a large amount of real time. Otherwise, the end user can notice "ring burps" (improper modulation of his set's ringer) and can operate the set buttons without these changes being detected by the software.

To allow the scan routines to determine if a station is equipped with a special lamp field, the SADT table was augmented to contain two bytes for every station. In addition to storing the hardware address of a station, a 5-bit indicator determines whether there is a lamp field at this station. If this 5-bit field is zero, this is a regular ten button MET or one of the CAPs. If this 5-bit field is non-zero, however, this means that the station has a lamp field. Furthermore, the 5-bit field is interpreted as a pointer to the date for those lamps (i.e., indicating whether they are in an ON or OFF state).

Figure 12:
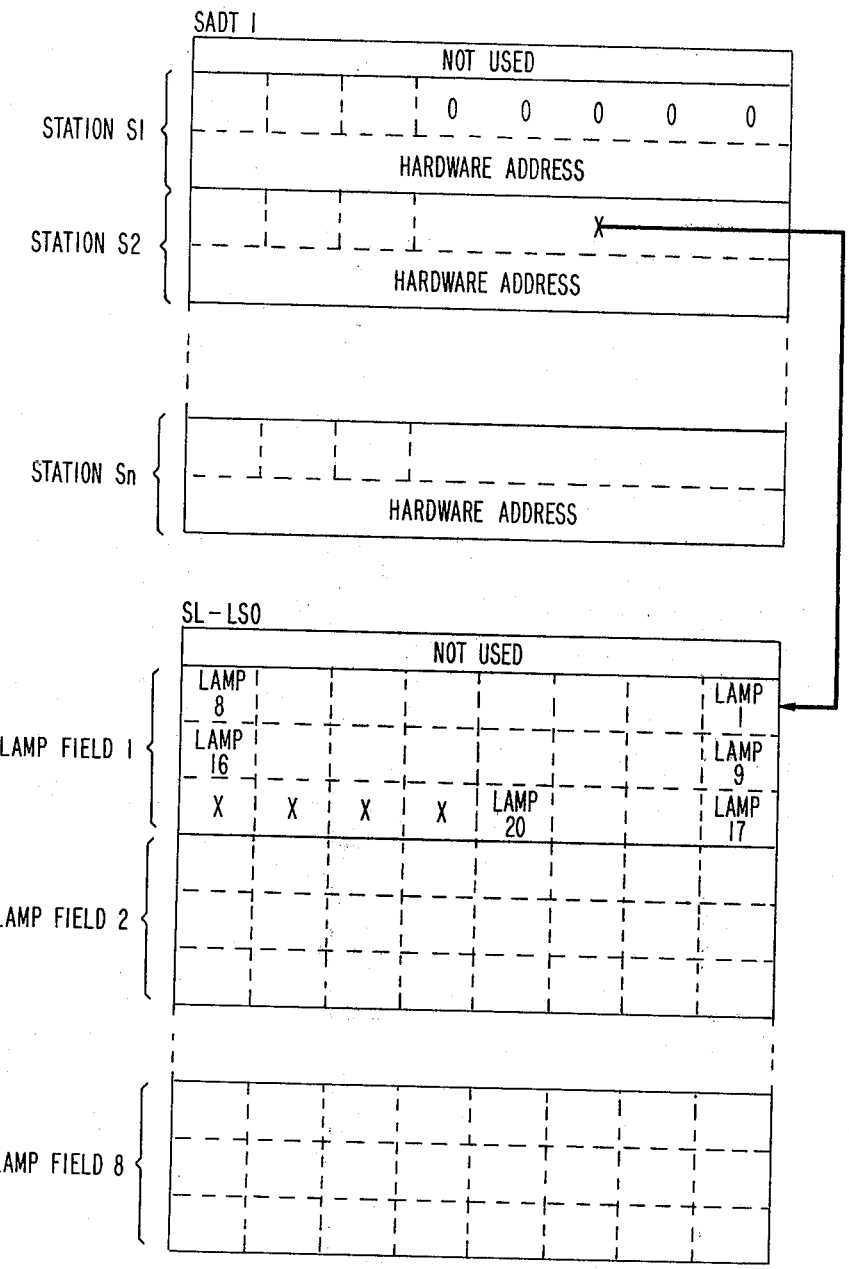
FIG. 12 shows how data for the lamp field is found.

The relationship between the SADT1 table and the SL-LSO table is indicated diagramatically in FIG. 12. As indicated, the 5-bit field for station S1 is zero. Thus this is a regular ten button MET. The 5-bit field for station S2, however, is non-zero and this entry points to the extra 20 bits of information which the scan routines must send to the set.

The SL-LSO table contains the instantaneous lamp state information (i.e., the values which are actually transmitted to the station every 25 ms). For a lamp to be flashing, however, the data in the SL-LSO table must be modulated at a much slower rate (i.e., 500 ms ON, 500 ms OFF, et cetera). This modulation responsibility was added to the same routine which does the modulation of the button STATUS lamps.

In order to properly update the SL-LSO table, LRATE must know: (1) whether the field is in demand ICI or automatic ICI mode at this moment, and (2) what the values of the lamps should be in demand or automatic mode.

Three tables are used for this purpose. First, SA-MODE indicates if the field is in demand or automatic mode. There is one entry per ICI station. Judging from the information in the SA-MODE entry, LRATE uses either the SL-ICI table (for automatic IICI) or the SL-DEM table (for demand ICI) to populate the SL-LSO table.

Automatic ICI on Ordinary ICM Buttons (1) The system checks to see if the called station has a special lamp field. This can be done by checking the 5-bit field in the SADT1 entry for this station. If it is zero, there is no lamp field.

(2) For ICM buttons, automatic ICI should display the identity of all incoming callers. This information is determined from tables which exist to associate facilities (whether they are stations, lines, paging ports, etc.) with the link on which this call is being made.

(3) When the identity of an incoming caller is determined, it is checked to see if there is a lamp associated with that caller. If there is a call from station S1 to a station S2 equipped with a SLF, the SASLF is searched for entries for station S2 to see if any of its lamps correspond to station S1. If so, the appropriate bit in SL-ICI is set to flash that lamp.

Automatic ICI on Coverage Buttons

Figure 13:
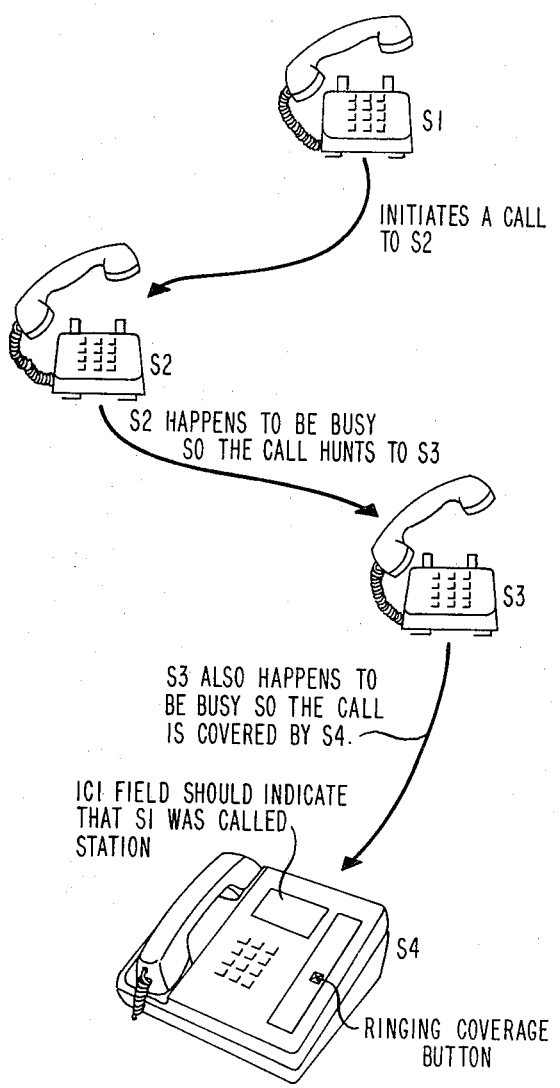
FIG. 13 shows automatic incoming call identification for coverage stations.

For coverage buttons the identity must be modified to show the original called station. This entails the following additions:

(1) Since the original called station is to be displayed with the lamp field with respect to coverage buttons, an extra data structure must be introduced to save this information. Note that the system does not necessarily still have the identity of the called party. Thus, as shown in FIG. 13, if a call initiated by station S1 hunts from station S2 to station S3 to station S4 then automatic ICI information at station S4 should indicate the original called station S1 and not station S3 which was one of the hunted-to stations. A RNG-CAL table is established. Each RNG-CAL entry stores the identity of the original called party for each cell. It is updated whenever a call is initiated on a link and is used when the call is brought to a coverage button on an ICI station. When a call is first initiated, the identity of the original called station or party is placed in this table for future reference. The use of RNG-CAL is indicated diagramatically in FIG. 14.

Automatic ICI on Return Buttons

The system contains components which were responsible for bringing a call back to the central answer position (CAP) for coverage. Such a call is usually released by the CAP (e.g., transfer an incoming call) to an internal station. When the call is unanswered for a predefined period of time, it will be brought back to the CAP on special Return keys. The desirable ICI information is the original called party. To display the information, the following modifications are necessary:

(1) When the call is first initiated by the CAP, the RNG-CAL entry for the link is filled with the identity of the original called station or party.

(2) When the call is returned to the CAP, the data in the RNG-CAL table is displayed using the selector console for output.

Demand ICI on Intercom Buttons

Demand ICI on intercom buttons should indicate the calling parties. Here is an overview of the system operation:

(1) When an intercom button is depressed, this is detected by the scan routines. If the station does not have ICI capability, this is nothing more to be done for ICI display.

(2) Otherwise, the SA-MODE entry for this station is updated to indicate that its lamp field should be in demand ICI mode.

(3) The identities of the parties in this call exist in the link record list NLST which is a set of five entries for every link. These five entries indicate the five parties who are currently active on that link (e.g., if there is a conference call with stations S1, S2, and S3 these three stations will be listed in the link record). For each of the parties listed in NLST, the following algorithm is executed:

if there is a corresponding lamp in the field (this is determined by looking at the translation entries for that field).
Set the appropriate bits in the SL-DEM table.

(4) The scan routines will do the rest and will output the demand ICI information to the set.

(5) When the button is finally released, the scan routines (EKTSCAN and SCANLMP) will notice this and will change the SA-MODE table to indicate that the field should go back to automatic ICI mode.

Demand ICI on Coverage Buttons

The procedures are similar to those described for demand ICI on intercom buttons except that the called station identity is located from the RNG-CAL table and is output. The algorithm is:

When a coverage button is depressed on a station with ICI capability
Determine what link that call is on
Determine the original called party from the RNG-CAL data associated with that link.
Display the called station in the ICI field if possible.

Figure 9:
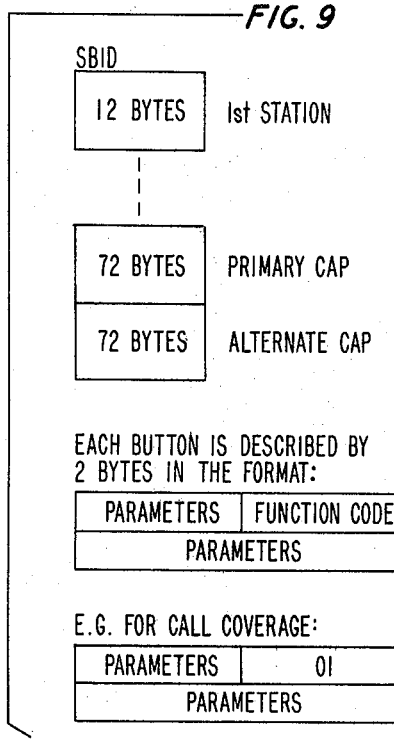
FIG. 9 shows the translation of the buttons.

We claim:

1. In a communication system having a plurality of multibutton stations each having capability of communicating with other stations over communication lines internal to the system wherein each button of each multibutton station is nonlocking and operable to establish communication connections to said station, said system comprising means (16-1; FIG. 8; FIG. 12, SADT-1, SL-LSO) for providing visual signals at each communication control button of each station (S1, S2, S3) as an indication that a calling connection is incoming to the line controlled by said button at said station, one of said buttons (210B) at a first station (S3) designated as a call coverage button operable to enable a communication connection between said first station (S3) and a first line on which a calling connection is being directed to a second station (S2), a visual display field (214; FIGS. 3, 4 and 5; FIG. 14, RNG-CAL) at said first station operable when a call is directed to said first station for indicating the identity of the calling station (S1), said system CHARACTERIZED IN THAT there is also provided determining means (FIGS. 3, 2, 7, 18 and 29, FIG. 10) for use on each incoming call to said first station (S3) to identify calls directed to said call coverage button (210B), and means (FIG. 7; FIG. 9; FIG. 14; SL-ILJ) responsive to an identified call directed to said call coverage button (210B) for inhibiting said visual indication of said calling station (S1) and for substituting therefor on said visual display field an indication of the original called station (S2).

2. The invention set forth in claim 1 further CHARACTERIZED IN THAT said system is operable (FIG. 8, SEIO) for providing first visual indications on said visual display field indicative of the busy-idle status of all of said stations and second distinct visual indications on said visual display field of a called one of said stations indicative of the identity of a calling station, so that said visual display field serves the dual function of providing station busy identification and incoming call identification.

3. The invention set forth in claim 2 further CHARACTERIZED IN THAT said system also comprises means (FIG. 8; SEIO; FIG. 14; SL-LSO) responsive to the operation of one of said nonlocking keys at a particular station for inhibiting said busy station status indications at said station and for enabling at said particular station said calling station status indications.

* * * * *